United States Patent [19]
Van Dijk

[11] 3,974,327
[45] Aug. 10, 1976

[54] AUTOFOCUS CIRCUIT FOR A VIDEODISC PLAYBACK DEVICE

[75] Inventor: Ate Van Dijk, Eindhoven, Netherlands

[73] Assignee: U.S. Philips Corporation, New York, N.Y.

[22] Filed: Mar. 3, 1975

[21] Appl. No.: 555,198

[30] Foreign Application Priority Data
Dec. 23, 1974 Netherlands.................. 7416754

[52] U.S. Cl..................... 178/6.6 R; 179/100.3 V; 178/6.7 A; 250/201
[51] Int. Cl.²......................................... G11B 11/00
[58] Field of Search............ 179/100.3 V, 100.4 R, 179/100.4 M, 100.41 L; 178/6.7 R, 6.7 A, 6.6 R, 6.6 P, DIG. 29; 250/201

[56] References Cited
UNITED STATES PATENTS
| | | |
|---|---|---|
| 3,873,763 | 3/1975 | Janssen.......................... 179/100.3 V |
| 3,876,841 | 4/1975 | Kramer.......................... 179/100.3 V |
| 3,876,842 | 4/1975 | Bouwhuis...................... 179/100.3 V |

*Primary Examiner*—Bernard Konick
*Assistant Examiner*—Alan Faber
*Attorney, Agent, or Firm*—Frank R. Trifari; Simon L. Cohen

[57] ABSTRACT

An apparatus is described for reading a flat reflecting record carrier on which information is stored in an optically readable structure, which apparatus, inter alia, includes an objective system for focussing a read beam on the plane of the information structure and a focus detection system which is coupled to an electronic circuit for deriving a control signal for controlling the position of the objective system relative to the plane of the information structure. The electronic circuit is equipped so that the control signal ensures that during locking-in the objective system is moved with a low preferably constant, speed towards the record carrier until the required position is substantially attained, after which the objective system is subject to a high acceleration in the opposite direction.

4 Claims, 4 Drawing Figures

AUTOFOCUS CIRCUIT FOR A VIDEODISC PLAYBACK DEVICE

The invention relates to an apparatus for reading a flat reflecting record carrier on which information, for example video and/or audio information, is stored in an optically readable structure, which apparatus comprises a radiation source which supplies a read beam, an objective system for focussing the read beam on the plane of the information structure, a radiation-sensitive signal detection system for converting the read beam which is modulated by the information structure into an electric signal, and a focus detection system which is coupled to an electronic circuit for controlling the position of the objective system relative to the information structure. A focus detection system is to be understood to mean an auxiliary system which consists of a multiplicity of optical elements and radiation-sensitive detectors for determining a deviation between the actual and the desired position of the plane of focussing of the objective system.

The information structure may consist of a multitude of quasi-concentric tracks, which together constitute one continuous spiral track. The read apparatus is equipped so that only a small track portion of the size of approximately the smallest detail in the information structure is imaged on the signal detection system. The radiation paths between the radiation source and the plane of a track portion to be read and between said plane and the signal detection system, however, may be subject to variations. Said variations may have different causes. First of all, it may happen that the record carrier is not perfectly flat. Secondly, when the record carrier is a foil, it may flutter as the carrier rotates. Furthermore, the optical elements of the read apparatus may be susceptible to vibrations.

During the occurrence of such variations the signal detection system not only receives radiation from a track portion to be read, but also radiation from the surrounding area of said portion. As a result, the modulation depth of the output signal of the signal detection system decreases, while moreover cross-talk may occur, since the signal detection system no longer receives radiation from one track only but also radiation from adjacent tracks. Satisfactory signal detection is then no longer possible owing to the reduced modulation depth and the cross-talk.

Therefore, it is of great significance that the deviation between the actual and the desired position of the plane of the information structure can be detected and the focussing of the objective system can be corrected. For detecting said deviation said previous apparatus is provided with a focussing detection system, in which a narrow auxiliary beam (or focussing beam) is derived from the radiation source, which auxiliary beam is eccentrically passed through the objective system. After reflection at the information structure of the record carrier and a second passage through the objective system, the focussing beam falls onto a system of two radiation-sensitive focussing detectors which are separated by a gap. Comparison of the radiation intensities which are incident on the focussing detectors provides an indication of the degree of focussing.

To enable the focussing of the objective system to be controlled, said system can be disposed in a loudspeaker coil. The objective system can then be moved relative to the plane of the information structure by applying a suitable control signal to the loudspeaker coil. Said control signal is supplied by an electronic circuit to whose input terminals the output signals of the focussing detectors are applied.

When inserting a record carrier in the read apparatus the objective must be withdrawn so far that the record carrier cannot hit the objective. After the read apparatus has been switched on, the objective must be moved towards the record carrier until the distance between the objective and the record carrier is the required value for optimum reading. When during said "locking in" of the objective system the movement of said objective system is determined by the signals supplied by the focussing detectors, the objective system may not be braked sufficiently in due time at decreasing distance between said system and the record carrier, so that it collide with the record carrier.

The object of the present invention is to provide a read apparatus in which steps have been taken to prevent the objective system from colliding with the record carrier. The apparatus according to the invention is characterized in that the electronic circuit includes first means for superimposing an additional signal on the control signal supplied by the focussing detection system during locking-in of the objective system, in such a way that a resulting first control signal is obtained at the output of the electronic circuit which causes the objective system to move towards the record carrier, second means for limiting the resulting first control signal to a specific value, and third means to accomplish that when the objective system has approached the record carrier to approximately the required distance, a second control signal of a sign opposite to and an amplitude substantially greater than that of said resulting first control signal is obtained at the output of the electronic circuit, so that the objective system is subject to a high acceleration in a direction away from the record carrier.

A preferred embodiment of an apparatus according to the invention is further characterized in that the electronic circuit includes a differential amplifier whose inputs are connected to the focussing detectors and whose output is connected to a first input of an operational amplifier to a second input of which an auxiliary voltage source is connected via a switch, and a transistor output stage whose output circuit includes a drive element for the objective system.

The invention will now be described with reference to the drawing, in which.

Figure 1:
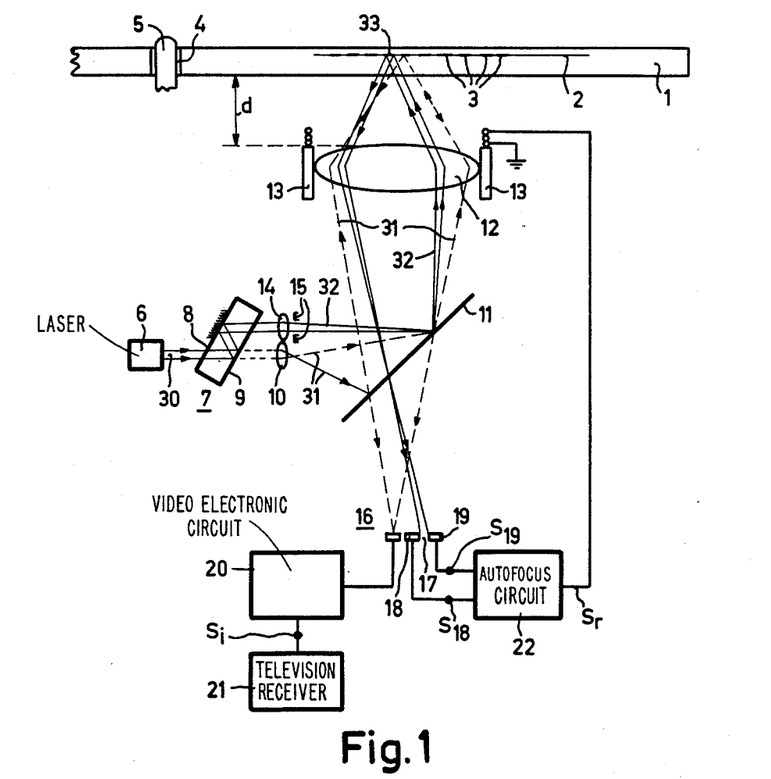
FIG. 1 shows an embodiment of a previously proposed apparatus for optically reading a record carrier, FIG. 2 clarifies the principle of the invention, FIG. 3, partly in block-schematic form, shows an electronic circuit according to the invention for use in the apparatus of FIG. 1, and FIG. 4 in detail shows an embodiment of such an electronic circuit.

In FIG. 1 the reference numeral 1 represents a round disc-shaped record carrier. Information tracks 3 are disposed in the plane 2 of said record carrier. An information track may consist of a multitude of areas alternating with intermediate areas, while the information, for example a colour television program, may be contained in the lengths of the areas and the intermediate areas. The record carrier body is radiation-transmitting and the information surface 2 radiation reflecting.

The record carrier is read with a radiation source 6, for example a laser, which emits a narrow radiation beam 30. The beam enters the beam splitter 7 via the surface 8. The surface 9 of the beam splitter is partially radiation-transmitting, so that a part of the beam 30 is transmitted as a read beam 31, while an other part of the radiation beam 30 is reflected to the surface 8.

The read beam 31 is focussed on the information surface 2 of the record carrier 1 by an objective system 12, which is schematically represented by a single lens. The auxiliary lens 10 ensures that the entire entrance pupil of the objective system 12 is filled. The record carrier can be rotated with the aid of a spindle which extends through an opening 4 in the record carrier. The read beam 31 is then modulated in accordance with the information structure which consecutively appears in the beam cross-section. After reflection at the surface of the information structure the modulated read beam traverses the objective system for a second time and subsequently falls onto, for example, a dividing mirror 11. This mirror transmits a part of the modulated read beam to the radiation-sensitive signal detector 16. The signal supplied by said detector is applied to an electronic ciricuit 20 in which, in known manner, an information signal $S_i$ can be formed, which can be rendered visible and audible, for example with the aid of a conventional television receiver 21.

When reading a record carrier whose optical information structure has very small details, for example of the order of 1 1μm, it is necessary that small variations in the position of the information surface can be detected so as to enable the focussing of the objective to be corrected. For determining said variations use is made of the part of the beam 30 which is reflected at the surface 9 of the beam splitter 7. This part of the beam 30, after total reflection at the surface 8 leaves the beam splitter as a second radiation beam 32. The beam 32 functions as a focussing beam and passes through the aperture of a diaphragm 15. The focussing beam enters the objective system 12 at a comparatively large distance from the optical axis of said objective system. After refraction by the objective system the focussing beam impinges on the radiation reflecting information surface 2. For the focussing beam the information surface functions as a mirror which reflects the beam to the objective system. The objective system then aims the focussing beam at an assembly of two radiation-sensitive focussing detectors 18 and 19, which are spaced apart by a narrow gap 17.

Then path of the focussing beam includes an auxiliary lens 14. Said auxiliary lens focusses the beam 32 in the focal plane of the objective 12, so that the focossing beam emerges from the objective as a parallel beam. Thus, a radiation spot of constant size is formed on the information surface 2, so that the radiation spot in the plane of the focussing detectors will also have a constant size independent of the distance between the information surface 2 and the objective 12.

The focussing detectors are arranged so that in the case of a correct position of the plane of the information structure, as is shown in FIG. 1, the image of the diaphragm aperture, which image is formed with the aid of the reflecting surface 2 and the objective system, is symmetrical relative to the detectors 18 and 19. The focussing detectors then receive equal radiation intensities. When the plane of the information structure is lowered or raised, the distance between the location where the focussing beam enters the objective system and the optical axis will decrease and increase respectively. The focussing beam will then be refracted through a smaller or greater angle respectively. As a result of this, the detector 18 will receive more radiation or less radiation respectively than the detector 19.

The signals $S_{18}$ and $S_{19}$ from the focussing detectors are applied to an electronic circuit 22 in which said signals are compared and a control signal $S_r$ is derived. The signal $S_r$ is applied to a device for moving the objective system, for example a loudspeaker coil 13, in which the objective system is suspended. Instead of by a loudspeaker coil the objective system can also be driven by other means, such as piezo-electric, magnetostrictive, or electrostatic means, each time using the signal $S_r$. Further, the invention to be described hereinafter is not limited to the use of the focus detection system of FIG. 1. Other opto-electronic systems for deriving a focus signal, such as for example that described in previous U.S. patent application Ser. No. 229,291, filed Feb. 25, 1972, and now U.S. Pat. No. 3,833,769 may also be employed.

Figure 2:
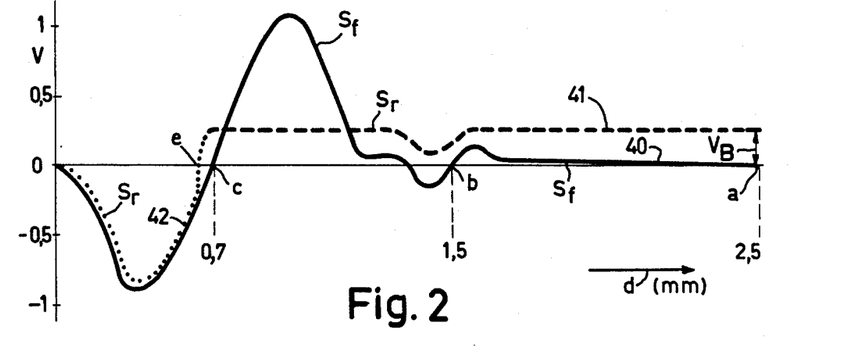

In FIG. 2 the signal $S_f$ which is obtained by comparison of the output signals of the focussing detectors 18 and 19 is represented by the drawn line 40 as a function of the distance of the objective system to the front of the record carrier (the distance $d$ in FIG. 1). The signal $S_f$ is plotted in volts, the distance $d$ in mm.

When the objective system is located at a distance greater than a from the record carrier, a being for example 2.5 mm, the focussing beam falls beyond the detectors 18 and 19, so that the focus detection system is inoperative and the signal $S_f$ is zero. When the objective system has approached the record carrier to within the distance $a$, the detector 19 will receive radiation from the focussing beam and the detector 10 will not yet receive any radiation, so that the signal is positive. In the case of a positive signal $S_f$ the objective is subject to an acceleration in an upward direction, towards the record carrier. Apart from the small voltage drop around the distance $b$, the signal $S_f$ remains positive until the distance between the objective system and the record carrier has the value $c$, which is for example 0.7 mm. The detectors 18 and 19 then receive equal amounts of radiation from the focussing beam. At smaller distances from the objective system to the record carrier the detector 18 receives a greater radiation intensity than the detector 19, and the objective system is subject to a downward acceleration, away from the record carrier.

During said "locking in" of the objective system two problems may occur. The information structure, as is shown in FIG. 1, may be located at the rear of a radiation-transmitting record carrier. This has the advantage that the record carrier itself functions as a protective layer, thus substantially eliminating the influence of dust particles which may settle on the record carrier, or of scratches which may arise in the record carrier on the read process. However, owing to said structure of the record carrier the focussing beam may also be reflected by the front of the record carrier, apart from by the information surface 2. Thus, if the objective system is so far from the record carrier (the distance $d$ in FIG. 2) that it is focussed on said front, the sign of the signal $S_f$ may be reversed. In that case it is not unlikely that the focus control system "views" said distance as the correct distance and controls in response to said distance.

When the objective system has approached the record carrier to the distance $c$, it will have a certain speed. The objective system must then be braked rapidly. The positive maximum and the negative maximum of the signal $S_f$ are of the same order of magnitude, so that the maximum negative acceleration will also be of the same order of magnitude as the maximum positive acceleration. If, as is shown in FIG. 2, the path of positive acceleration has been longer than that of negative acceleration, the speed of the objective at the distance $c$ cannot be reduced to zero within said distance, so that the objective system will collide with the record carrier.

According to the invention the electronic ciricuit 22 features steps to mitigate said problems. In the first place a positive bias is superimposed on the voltage derived from the signals from the focussing detectors. In FIG. 2 said bias is designated $V_B$. In the circuit 22 the positive electric current through the loudspeaker coil which exerts a force towards the record carrier on the objective system, is limited so that within the path from $a$ to $c$ the output signal $S_r$ of the circuit 22 will be as represented by the dashed curve 41. The positive acceleration of the objective system is consequently substantially limited. The signal $S_r$ is now also positive for the distance $b$, so that there is no longer the risk of the focus being controlled in response to the distance to the front of the record carrier. The bias voltage $V_B$ should merely compensate for the negative voltage at $b$, so that said bias can be very small, for example 0.3 V in the present embodiment.

Secondly, when it is established that the objective system has approached the record carrier to the distance $e$, the full negative voltage derived from the detector signals $S_{18}$ and $S_{19}$ is transferred by the circuit 22. Compare the dotted curve 42 in FIG. 2. As a result, the objective system is strongly braked, so that it returns to the distance $c$. The distance between $c$ and $e$ is for example only $2\mu m$, so that when using the circuit according to the invention the objective system will overshoot its nominal position by a very small distance only. The circuit can establish that the distance $e$ is reached in that the signal $S_f$ supplied by the focussing detectors exhibits an appreciable decrease.

Figure 3:
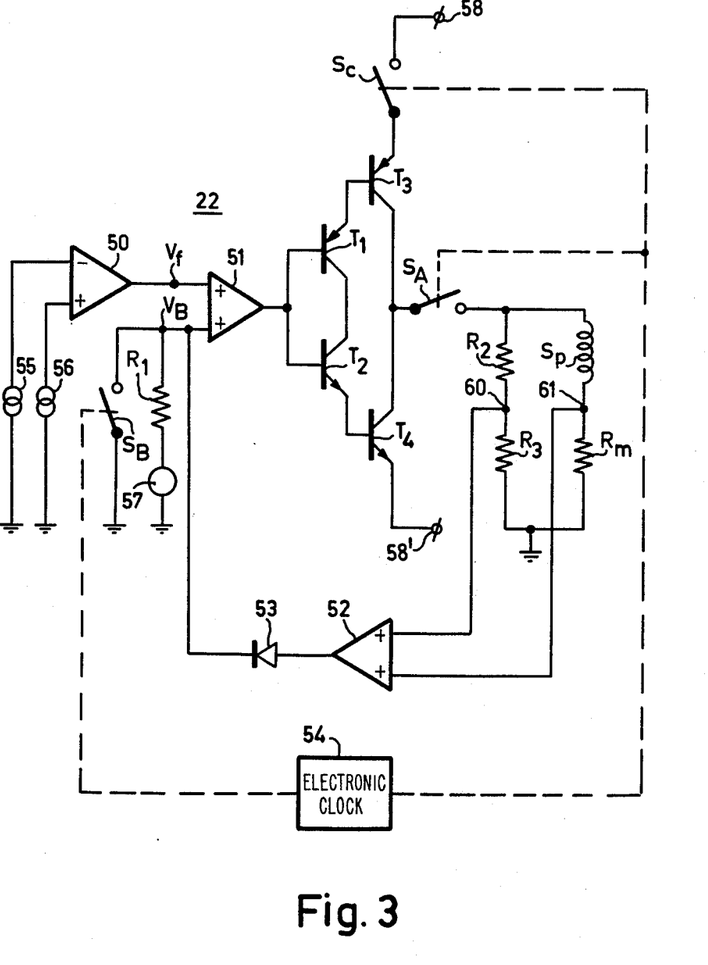

FIG. 3 shows an electronic circuit according to the invention, partly in block-schematic form. In said Figure the focusing detectors are designated 55 and 56 respectively. The output signals of said detectors are applied to a difierential amplifier 50. The output signal of the amplifier 50 is fed to an input of an operational amplifier 51, which functions as a summing device. The other input of the amplifier 51 is connected to a voltage source 57, of for example −15 V, via a resistor $R_1$, which source supplies said bias voltage $V_B$. The resistor $R_1$ can be connected to ground by a circuit $S_B$. The signal from the amplifier 51 is applied to an output stage which comprises the transistors $T_1$, $T_2$, $T_3$, and $T_4$. This output stage, which matches the high impedances at the left to the low impedances at the right, is fed from a voltage source, not shown, at the terminals 58 and 58'. The circuit of the positive supply voltage includes a switch $S_C$. The output circuit of the output stage includes a switch $S_A$ before the loudspeaker coil $S_p$ with which the objective system is moved. In response to a zero level signal output from amplifier 51, the current flow through $T_1$ and $T_2$ will be equal, thereby making the current flow through transistors $T_3$ and $T_4$ equal (providing switch $S_C$ is closed). In response to a positive signal from amplifier 51 transistor $T_1$ will lower its conductivity, while transistor $T_2$ will conduct more heavily, thereby increasing the conduction through transistor $T_4$ and decreasing the conduction through transistor $T_3$, whereby the current flows from ground through resistor $R_m$, coil $S_p$ and switch $S_A$. In response to a negative current from amplifier 51 transistor $T_2$ will lower its conductivity, transistor $T_1$ will increase its conductivity, resulting in an increase in conductivity of transistor $T_3$ and a decrease in conductivity of transistor $T_4$. This in turn causes current to flow from the positive source connected to terminal 58 through switch $S_C$, transistor $T_3$, switch $S_A$, coil $S_p$ and resistor $R_m$ to ground. Thus in response to a positive voltage from amplifier 51 current flows through coil $S_p$ in one direction, while in response to a negative voltage from amplifier 51 current flows through coil $S_p$ in the opposite direction. When switch $S_C$ is in the open position shown in FIG. 3 obviously no current can flow through transistor $T_3$. In response to the opening fo switch $S_C$ current is therefore limited to a unidirectional flow through coil $S_p$. In addition, since current cannot flow into the collector of transistor $T_2$ from transistor $T_1$, transistor $T_2$ no longer operates as an amplifier, but merely acts as a diode utilizing the base-emitter path thereof. The effective amplification factor existing between the output of amplifier 51 and the coil $S_p$ is thereby decreased.

Before a record carrier is inserted in the read apparatus, the power supply and the bias $V_B$ are applied first.

When fitting a record carrier in the read apparatus of FIG. 1 switches $S_A$, $S_B$ and $S_C$ are open. Next, the motor for driving the spindle 3 and the laser are started, so that the record carrier, which may be a thin disc or foil is allowed to straighten and the laser is allowed to stabilize. Subsequently, the switch $S_A$ is closed.

During locking-in of the objective system the acceleration of the objective system is initially determined by the bias $V_B$. When the objective system has approached the record carrier to a distance smaller than $a$, said bias and the voltage $V_f$, which is supplied by the amplifier 50, together determine the acceleration. As the positive supply voltage for the output stage is switched off, the positive current through the loudspeaker coil cannot be supplied by the transistors $T_1$, $T_2$, $T_3$ and $T_4$, but said current must flow via the operational amplifier. Thus, said current can only have a limited value. At the instant that the objective system has approached the record carrier to a distance $e$, the voltage $V_f$ at the output of the amplifier will suddenly drop very strongly. The influence of the bias then becomes negligible, and there will be a large negative current through the loudspeaker coil. Said current can flow because the negative supply voltage is always available. The objective system is subject to a high acceleration in downward direction and is rapidly moved to the distance $c$, the required distance, from the record carrier. The switch $S_B$ can then be closed, so that the bias is short-circuited. When furthermore switch $S_C$ is also closed, the current through the coil $S_p$ can only be determined by the output signal of the amplifier 50. Said signal, which varies in accordance with the curve 40 in FIG. 2, which is steep around point $c$, enables possible focussing errors to be corrected rapidly.

The switches $S_A$, $S_B$ and $S_C$, which in reality are electronic switches, can be actuated by an electronic clock which in FIG. 3 is schematically represented by 54. The time between the closure of the switch $S_A$ and the closure of the switches $S_B$ and $S_C$ may for example be 100 msecs. For reaching the distance $e$ for example 40 msecs. are required.

With the focussing control described so far, the objective system is driven with a constant force during locking-in of said system, so that the objective system moves towards the record carrier with a constant acceleration. The lock-in range, i.e. the distance over which the speed of the objective system must be reduced to zero, can be substantially reduced according to the invention when care is taken that the objective system moves with a constant speed. For this use can be made of a back-EMF (electromotive force) which is induced in the coil of the objective system as soon as the objective system is put into motion. FIG. 3 schematically shows a control circuit for driving the objective system with a constant speed.

Figure 4:
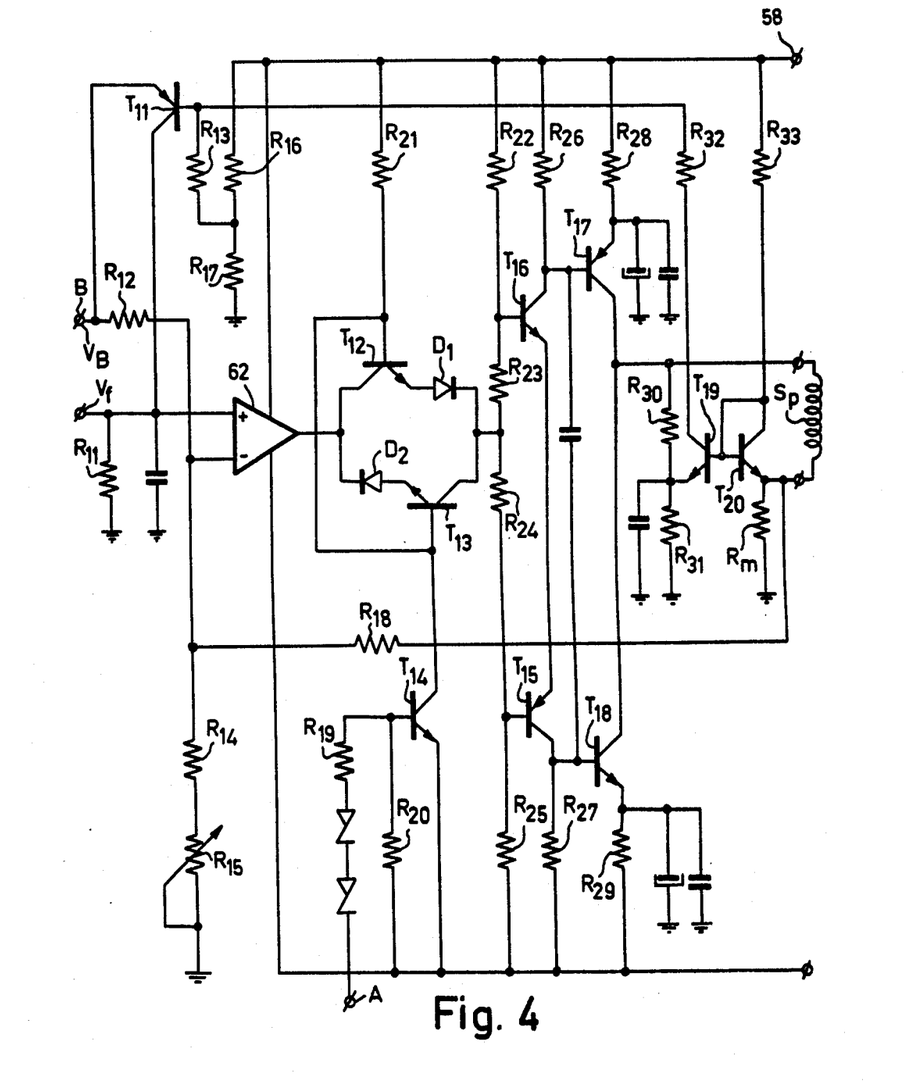

The loudspeaker coil $S_p$ forms part of a bridge circuit. The different bridge arms are formed by the ohmic resistance ($R_L$) of the coil, the measuring resistance Rm and the two resistors $R_2$ and $R_3$. The ratio $R_2/R_3$ is selected to equal the ratio $R_L/Rm$. When the objective system starts moving, the bridge circuit is unbalanced. The voltage between the points 60 and 61 is applied to an input of the operational amplifiier 51 via an amplifier 52. By including in the feedback path an element 53 which conducts in one direction only, it is assured that feedback is provided for only one polarity of the current through the coil. As a result, the speed of the objective system is maintained constant in one direction only (towards the record carrier). The feedback system has a certain open-loop gain. The magnitude of said gain determines the degree of constancy of the speed of the objective system. The feedback, which acts as a damping, exists only when the objective system moves towards the record carrier. From the instant that the objective system has reached the minimum distance to the record carrier and the sign of thhe speed is reversed, the feedback is discontinued. FIG. 4 shows an embodiment of the electronic circuit according to the invention to the invention in detail. Only elements which are of significance for the principle of the invention will be discussed.

The signal $V_f$ which is obtained from the focussing detection system is amplified by an operational amplifier 62. The operational amplifier is followed by a switch which consists of two diodes ($D_1$ and $D_2$) and two transistors ($T_{12}$ and $T_{13}$), which switch can handle both positive and negatiive voltages. The switching voltage of said switch is applied to point A and is derived from a shift register, not shown. The switch is followed by the output stage, whose output circuit includes the coil $S_p$ with which the objective system is driven. This coil is connected in series with the resistance $R_m$. The voltage across said resistance is fed back to that input of the operational amplifier to which also the auxiliary voltage $V_B$ is applied. Owing to the feedback the current through the coil $S_p$ is always proportional to the input voltage. The coil $S_p$ and the resistance $R_m$ are two branches of a bridge circuit whose other brancehes are constituted by the resistors $R_{30}$ and $R_{31}$ is connected to the emitter of a transistor $T_{19}$, and that of the coil and the resister $R_m$ to the emitter of a transistor $T_{20}$.

When the bridge circuit is balanced there will be specific collector current in the transistor $T_{19}$. Said collector current causes such a voltage drop across the resistor $R_{13}$ that transistor $T_{11}$ is cut off. When the objective system begins to move, the collector current through the transistor $T_{19}$ will vary.

Before the objective system starts to lock in, the auxiliary voltage $V_B$ is available at point B. The voltage at point A is then so high that the switch is not yet turned on. After some time such a voltage is applied to point A that the switch is turned on. The auxiliary voltage $V_B$ remains available. Across the coil $S_p$ a negative voltage will then appear, so that a force is exerted on the objective system in a direction towards the record carrier. Owing to the movement of the objective system the collector current through the transistor $T_{19}$ changes in such a way that the transistor $T_{11}$ is turned on. The voltage at the input of the operational amplifier to which the voltage $V_f$ is applied increases so that the voltage across the coil for driving the objective system decreases. The control circuit will adopt a balanced condition in which the objective system has a constant speed. As the transistor $T_{11}$ can only supply a current from a positive supply, the speed of the objective system can be maintained constant in one direction only. When the objective system moves away from the record carrier the transistor $T_{11}$ will cut off. After a time which suffices to allow the objective system to assume the setting for a correct focussing, the auxiliary voltage $V_b$ is disconnected. The transistor $T_{11}$ can then no longer be turned on and the feedback is no longer present.

What is claimed is:

1. An apparatus for reading a flat reflecting record carrier on which information is stored in an optically readable structure, comprising a radiation source means for supplying a read beam; an objective system for focussing the read beam on the plane of the information structure; a radiataion-sensitive signal detection system for converting the read beam after having been modulated by the information structure into an electrical signal; and an objective position control system, the objective position control system comprising focus detection means for providing an electrical focussing signal corresponding to the direction and magnitude of the deviation of the objective system from a predetermined distance from the information structure of the record carrier at which predetermined distance the read beam is focussed on the information structure, a signal controlled objective drive means for advancing the objective system toward the record carrier information plane from a rest position at a distance exceeding said predetermined distance to a position closer than said predetermined distance and for moving said objective system away from said record carrier, first signal controlled electrical means for selectively connecting said focussing signal to said objective drive means in response to a first timing signal, second signal controlled electrical means connecting said focus detection means to said drive means through said frist signal controlled electrical means for selectively amplifying the focussing signals that advance and move back the objective system in response to a second timing signal and for selectively amplifying and amplitude limiting only those focussing signals that advance the objective system in response to an absence of said second timing, signal, third signal controlled electrical means responsive to an absence of said second timing signal for selectively adding to said focussing signals an electrical bias signal that tends to advance the objective system at a substantially uniform rate toward the record carrier and for providing velocity feedback to said objective drive means through said first signal controlled electrical means, thereby advancing said objective system at a substantially fixed velocity in response to an absence of said second timing signal, and clock means for providing said first timing signal for said first signal controlled electrical means and for concurrently providing an absence of said second timing signal for said second and third signal controlled electrical means to advance the objective system from said rest position toward said record carrier at a substantially fixed velocity and for providing said second timing signal at a time after the initiation of the first timing signal calculated to be such that the objective system is closer to the record carrier than said predetermined distance 2. An apparatus as recited in claim 1 wherein said third signal controlled electrical means comprises an operational amplifier having at least two inputs and an output, a first of the two inputs of said operational amplifier being connected to said electrical focussing signal of said focus detection means, an auxiliary voltage source connected to a second input of said operational amplifier, and a first signal controlled switch connected to said auxiliary voltage sosurce and to said second input of said operational amplifier for controlling the application of said auxiliary voltage to said second input of said operational amplifier in response to an absence of said second timing signal.

3. An apparatus as recited in claim 2, wherein said second signal controlled dectrical means comprises a transistor amplifier, two opposite bias sources, means connecting said transistor amplifier directly to one of said bias sources, and a second signal controlled switch selectively connecting said opposite bias source to said transistor amplifier in response to said second timing signal.

4. An apparatus as recited in claim 2, wherein said signal controlled objective drive means comprises a coil disposed in a magnetic field, and wherein said velocity feedback of said third signal controlled electrical means comprises a bridge circuit including said coil, and a diode connecting said bridge circuit to said operational amplifier and said first signal controlled switch.

* * * * *

UNITED STATES PATENT AND TRADEMARK OFFICE
CERTIFICATE OF CORRECTION

PATENT NO. : 3,974,327
DATED : August 10, 1976
INVENTOR(S) : ATE VAN DIJK

It is certified that error appears in the above-identified patent and that said Letters Patent are hereby corrected as shown below:

Col. 2, line 17, before "collide" should be --may--;

Col. 3, line 28, cancel "1" first occurence;

line 47, "Then" should be --The--;

Col. 6, line 16, "fo" should be --of--;

Col. 7, line 36, "thhe" should be --the--;

line 37, "Fig 4" should begin a new paragraph;

line 38, cancel "to the invention" second occurence;

line 60, after "$R_{31}$" should be --. The junction of the resistors $R_{30}$ and $R_{31}$--;

line 61, "resister" should be --resistance--;

line 63, after "be" should be --a--;

UNITED STATES PATENT AND TRADEMARK OFFICE
CERTIFICATE OF CORRECTION

PATENT NO. : 3,974,327
DATED : August 10, 1976
INVENTOR(S) : ATE VAN DIJK

It is certified that error appears in the above-identified patent and that said Letters Patent are hereby corrected as shown below:

Claim 1, line 33, after "timing" cancel the comma;

Claim 2, line 9, "sosurce" should be --source--;

Claim 3, line 2, "dectrical" should be --electrical--;

Signed and Sealed this

Twenty-sixth Day of October 1976

[SEAL]

Attest:

RUTH C. MASON
*Attesting Officer*

C. MARSHALL DANN
*Commissioner of Patents and Trademarks*